United States Patent [19]
Knapp

[11] 3,931,990
[45] Jan. 13, 1976

[54] BICYCLE

[75] Inventor: Ronald Ralph Knapp, Hacienda Heights, Calif.

[73] Assignee: Yamaha International Corporation, Buena Park, Calif.

[22] Filed: Sept. 16, 1974

[21] Appl. No.: 506,447

[52] U.S. Cl. .............................. 280/283; 280/281
[51] Int. Cl.[2] ........................................ B62K 25/04
[58] Field of Search .......... 280/283, 284, 275, 285, 280/281; 180/32

[56] References Cited
UNITED STATES PATENTS

| | | | |
|---|---|---|---|
| 644,957 | 4/1900 | Williams | 280/284 |
| 973,217 | 10/1910 | Sager | 280/284 |
| 1,152,773 | 9/1915 | White | 280/284 |

*Primary Examiner*—Kenneth H. Betts
*Assistant Examiner*—R. Schrecengost
*Attorney, Agent, or Firm*—Lindenberg, Freilich, Wasserman, Rosen & Fernandez

[57] ABSTRACT

A bicycle is provided having front and rear frames pivotally connected together near the pedal bearings and resiliently coupled by a shock absorber, in which the rear frame has a pair of inclined structural members extending on either side of the seat-supporting tube of the front frame and holding a rear end of the shock absorber at a position directly in front of the seat-supporting tube.

7 Claims, 2 Drawing Figures

BICYCLE

BACKGROUND OF THE INVENTION

This invention relates to bicycles.

The most common type of bicycle has a one-piece frame connected to the front and rear wheels, the frame including a seat-supporting tube which receives a shaft that holds the seat at an adjustable height. It has been recognized that the rider can be better isolated from road shocks by utilizing a two-piece frame which includes a front frame coupled to the front wheel, a rear frame coupled to the rear wheel and pivotally connected to the front frame, and a shock absorber which urges the frames towards a normal position but which allows them to pivot with respect to each other to absorb a shock. The design of a simple and effective bicycle of the latter type has been hampered by difficulty in the placement of the shock absorber that couples the front and rear frames. Thus, for example, U.S. Pat. No. 644,957 utilizes a shock absorbing spring that lies in an upper tubular frame member and which extends through a special slot in the feed shaft, to accommodate the shock absorber while still permitting slideable adjustment of the seat shaft. U.S. Pat. No. 644,787 eliminates the need for a complicated mechanism extending through the seat shaft by locating the entire shock absorber behind the seat-supporting tube, but only a short shock absorber can be used. Italian Pat. No. 425,968 shows a bicycle with shock absorbers lying on either side of the seat-supporting tube, but this requires two shock absorbers that are laterally spaced. A relatively simple bicycle of the type utilizing two pivotally connected frames, but which employed a single long shock absorber mounted for maximum shock absorption and in a manner that provided minimum interference with normal riding of the bicycle, would permit an economical bicycle to be provided for riding over rough terrain.

SUMMARY OF THE INVENTION

In accordance with one embodiment of the present invention, a bicycle is provided which is of simple and economical design, and which provides good shock isolation of the rider from a rough terrain. The bicycle includes front and rear frames respectively coupled to the front and rear wheels of the bicycle and pivotally connected together near the pedal bearing. The front frame is of the typical bicycle design, including a steering tube at the front which receives a steering assembly, an upper horizontal member extending rearwardly from the steering tube, a diagonal member extending downwardly and rearwardly from the steering tube, and a seat-receiving tube extending largely vertically and connecting the rear ends of the upper and diagonal members. The rear frame includes a pair of inclined members which extend on either side of the seat-receiving tube of the front frame, and which are bent together to lie directly in front of the seat-receiving tube. A single long shock absorber has a rear end attached to the forward ends of the inclined members of the rear frame immediately in front of the seat-receiving tube, the shock absorber having a front end lying immediately behind the steering tube of the front frame and attached to a clamp at the top of the diagonal member of the front frame. The front frame also includes a pair of bracing members which extend nearly horizontally but generally slightly below the shock absorber, and which extend on either side of the two incline members of the rear frame.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
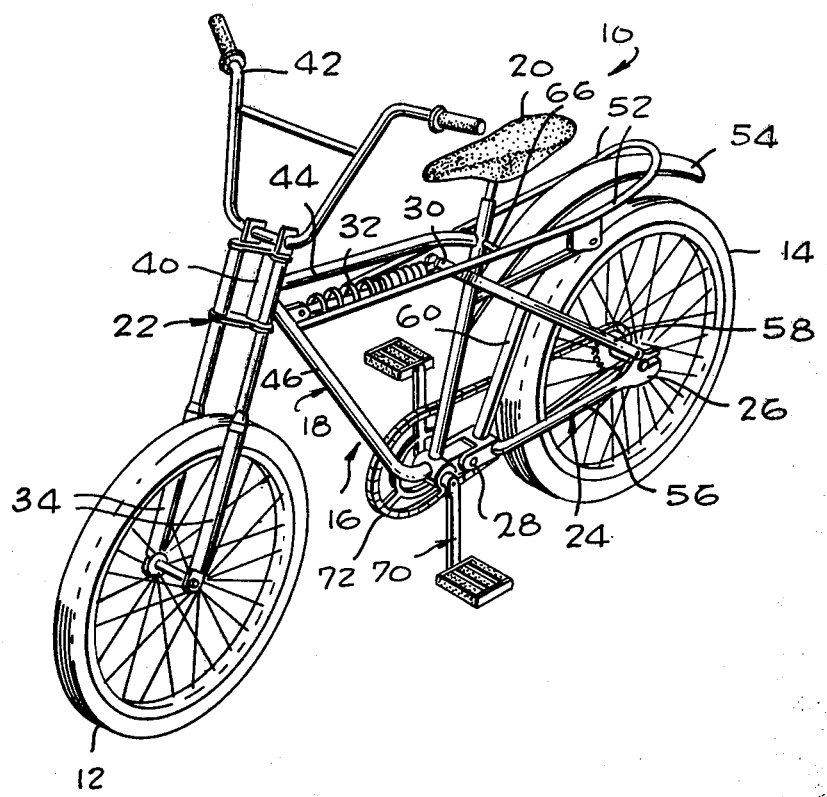
FIG. 1 is a perspective front and side view of a bicycle constructed in accordance with the invention.
Figure 2:
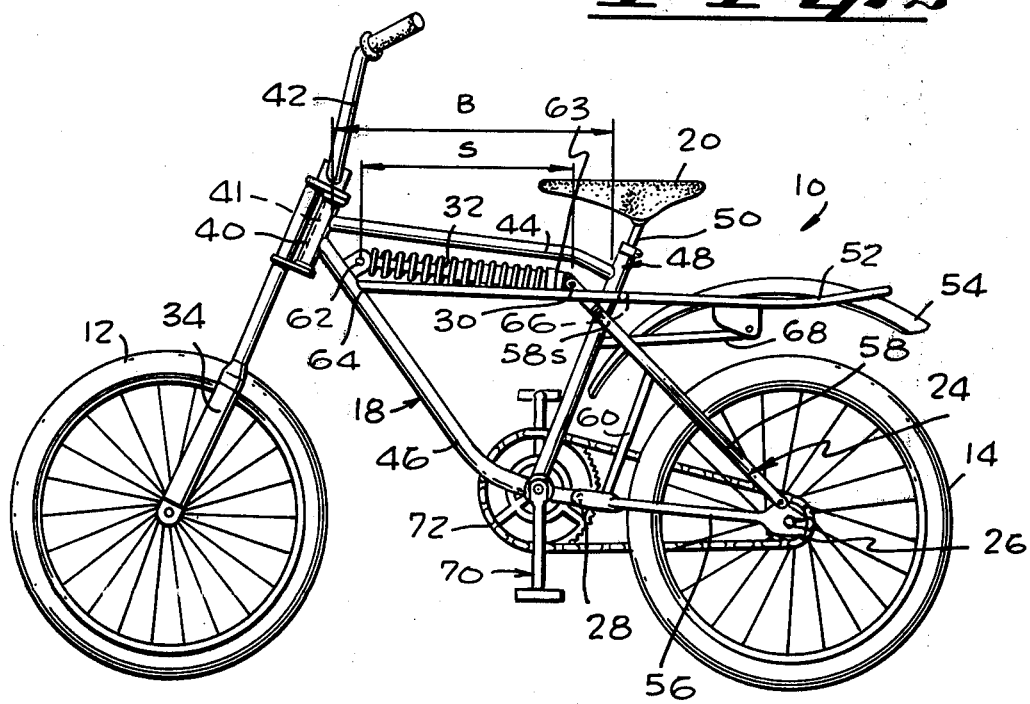
FIG. 2 is a side elevation view of the bicycle of FIG. 1.

The figures illustrate a bicycle 10 of the invention which includes front and rear wheels 12, 14 and a frame assembly 16 supported on the wheels. The frame assembly includes a front frame 18 which supports a rider-holding seat 20 and which is connected by a steering assembly 22 to the front wheel. The frame assembly also includes a rear frame 24 with a rear end 26 connected to the rear wheel 14 and a front end with a lower part pivotally connected at 28 to the front frame and an upper part 30 connected by a shock absorber 32 to the front frame. When the rear wheel 12 encounters a large bump and moves up, the rear frame 24 pivots at 28 with respect to the front frame so that much of the shock is absorbed by the shock absorber 32 and therefore the seat 20 is raised only a small distance. In a similar manner, when the front wheel 12 encounters a bump, some of the shock is absorbed by a pair of front shock absorbers 34 of a steering assembly, and movement of the front frame 18 is partially absorbed in pivoting about the axis at 28, as well as in pivoting of the bicycle about the rear wheel, which results in a less intensely felt shock for the rider.

The front frame 18 includes a steering tube 40 at the front which receives a steering shaft 41 fixed to the handlebars 42, an upper horizontal member 44 extending rearwardly and within several degrees from the horizontal from the steering tube 40, a diagonal member 46 extending downwardly and rearwardly from the steering tube 40, and a primarily vertical seat-support or seat-receiving tube 48 which connects the rear ends of the upper and diagonal members 44, 46. The seat-receiving tube or member 48 is a tube open at its upper end, to receive the seat shaft 50 and clamp it at a range of positions so as to adjust the height of the seat. The front frame also includes a pair of bracing members 52 with front ends connected to the diagonal member 46, middle portions connected to the seat-receiving member 48, and a rear end which supports a rear fender 54.

The rear frame 24 is of largely triangular design, and includes a pair of horizontal lower members 56 lying on either side of the rear wheel, a pair of inclined shock-support members 58 also lying on either side of the rear wheel, and a front member 60 connecting the lower and incline members together at a position immediately in front of the rear wheel.

The use of two pivotally connected frames and a shock absorber results in a relatively "crowded" mechanism immediately below the seat 20, where the inclined rear frame members 58 connect to the shock absorber 32, the seat-receiving tube 48 extends downwardly, and the bracing members 52 extend rearwardly. In order to provide a relatively simple and good riding bicycle, the inclined rear frame members 58 are constructed so that their forward end portions lie on either side of the seat-receiving tube 48 and are angled together immediately in front of the tube 48. The upper front part 30 of the inclined members and of the rear frame are therefore centered on the bicycle frame and lie immediately in front of the seat tube 48. The upper front end 30 of the rear frame therefore can be connected in a simple manner to the rear end of a long shock absorber 32 which can extend nearly the entire length of the space between the steering tube 40 and seat tube 48 of the front frame. This area, immediately below the upper horizontal member 44 of the front frame, is especially suited to receiving a long shock absorber, because it forms a long unobstructed area along the center of the plane of the bicycle (the imaginary plane perpendicular to the axes of the front and rear wheels and passing through the center of the wheels). The shock absorber 32 has a front end connected by a bracket 62 to an upper end of the diagonal member 46 at a position immediately behind the steering tube 40. The shock absorber 32 preferably extends a length S which is most of the available unobstructed distance B within the front frame, and preferably at least two thirds of this distance, so that the shock absorber is long to apply a relatively constant spring rate during pivoting of the frames. The shock absorber also preferably lies immediately below the upper member 44 with a clearance between them which is less than the diameter of the shock absorber. The shock absorber 32 is normally installed in an unloaded condition to facilitate assembly, but has a preloading device 63 thereon. After installation, the shock absorber is preloaded, with the front ends 30 of the inclined rear frame members pressing hard against the steering tube 48 of the front frame. The preloading avoids large frame pivoting resulting from the mere weight of the rider. The amount of preloading can be adjusted to equal approximately the weight of the expected rider, which is typically a child of perhaps 12 years weighing about 100 pounds. The preloading device 63 is easily adjustable by a dealer or other mechanically inclined person, to a preloading which produces a slight movement, such as one-quarter inch at the rear shock absorber end, when the child who will ride the bicycle sits on the seat.

The bracing members 52 have front ends fixed at 64 to the diagonal member 46 of the front frame immediately below the shock-absorber clamp 62. The bracing members 52 also have middle portions that are fixed by a cross member 66 to the seat-receiving tube 48, and have rear ends that are joined together and which support the bracing members 52 on the seat-receiving member 48. The bracing members 52 not only serve to support the rear fender, but also tend to provide an enclosure for the shock absorber 32 to prevent contact of a rider with a shock absorber. The bracing members 52 lie at a level below the shock absorber 32 so that the shock absorber is largely enclosed by these bracing members and the upper member 44 of the front frame. Since the bracing members 52 are fixed to the front frame, they must not rub on the incline members 58 of the rear frame, although they must pass across them. To prevent such rubbing, the bracing members 52 are positioned at a height slightly above the location 58s where the incline members 58 lie on either side of the seat-receiving tube 48. As a result, the location where the bracing members 52 lie on either side of the incline members 58, is a location where the incline members have been angled together and are therefore relatively close together so they do not rub on the bracing members.

The bicycle 10 is especially useful in riding over rough terrain or over an obstacle course having ramps, curbs to ride onto, and other obstacles which test a rider's skill. A rider sits on the seat 20 with his feet engaged with a pedal assembly 70 rotatably mounted at the bottom of the front frame immediately in front of the pivot axis 28 where the rear frame is connected, and coupled by a chain 72 to the rear wheel. The weight of the rider overcomes most of all of the preloading of the shock absorber 32, so that any large bumps tending to lift the front or rear wheels tend to cause pivoting of the frame to minimize jolting of the rider.

Thus, the invention provides a bicycle of the type which includes pivotably connected front and rear frames, in which a single long preloaded shock absorber couples the frames and the frame protects the shock absorber at the top and on either side thereof. This is accomplished by utilizing a rear frame with a pair of incline members 58 that lie on either side of the seat-receiving tube 48 of the front frame and which have front ends angled close together and connected to a shock absorber which is centered on the plane of the bicycle. A pair of bracing members 52 is also utilized which pass on either side of the incline members 58 above, and in front of, the positions where they straddle the seat-receiving tube 48.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A bicycle comprising:
    front and rear wheels;
    a front frame having a forward end forming a steering tube, a substantially horizontal upper member extending rearwardly from said steering tube, a diagonal member extending rearwardly and downwardly from said steering tube, and a tubular seat-support member coupling rearward portions of said upper and diagonal members;
    a seat assembly including a seat shaft received in said tubular seat-supported member and a seat at the top of said seat shaft;
    a pedal assembly rotatably connected to said front frame near the rearward end of said diagonal member thereof;
    a steering assembly coupling said front frame to said front wheel, including a steering shaft extending through said steering tube;
    a rear frame having a rear end coupled to said rear wheel, a lower front end pivotally coupled to said front frame, and an upper front end which includes a pair of shock-support members extending on either side of said tubular seat-support member; and
    a shock absorber lying below said horizontal upper member of said front frame and having a rearward end lying in front of said tubular seat-support member and coupled to the forward ends of said shock-support members, said shock absorber extending substantially horizontally and parallel to said upper member and having a front end lying immediately behind said steering tube so that the length of the shock absorber is at least two-thirds the maximum length of space between said steering tube and seat-support member of said front frame;

the front and rear ends of said shock absorber being pivotally connected respectively to said front frame and to said shock-support members of said rear frame, and said shock absorber being free of confinement by either of said frames between the pivotally connected ends of said shock absorber.

2. A bicycle comprising:

front and rear wheels;

a front frame having a forward end and having a lower rearward portion located between the wheels, said lower rearward portion having a pedal bearing and a rear frame bearing;

a seat for holding a rider;

a pedal assembly rotatably mounted on the pedal bearing, for rotational driving by the rider;

chain means coupling the pedal assembly to the rear wheel;

a rear frame having a rearward portion rotatably connected to the rear wheel, a lower front portion pivotally mounted on the rear frame bearing, and an upper front portion; and a shock absorber having a rearward end connected to said upper front portion of said rear frame and a forward end connected to said front frame;

said front frame having a seat-support member which extends primarily vertical at a rear portion of said front frame and which supports said seat, and said rear frame having a pair of shock-support members with forward portions lying on either side of said seat-support member of said front frame and with forward ends lying in front of said seat-support member, said forward ends of said shock-support members connected together and to the rearward end of said shock absorber;

said front frame including an upper elongated member extending substantially horizontally between said forward end of said front frame and an upper portion of said seat-support member, and also including a pair of bracing members having front ends fixed to said forward end of said frame and extending below said upper member and on either side of said seat-support member; and said shock-support members passing on either side of said seat-support member at a position (58s) below said bracing members, and the front ends of said shock-support members being angled towards each other and passing upwardly between said bracing members.

3. A bicycle comprising:

front and rear wheels;

a front frame having a forward end and having a lower rearward portion located between the wheels, said lower rearward portion having a pedal bearing and a rear frame bearing;

a seat for holding a rider, and means for mounting said seat on said front frame;

a pedal assembly rotatably mounted on the pedal bearing, for rotational driving by the rider;

chain means coupling the pedal assembly to the rear wheel;

a rear frame having a rearward portion rotatably connected to the rear wheel, a lower front portion pivotally mounted on the rear frame bearing, and an upper front portion; and a shock absorber having a rearward end connected to said upper front portion of said rear frame and a forward end connected to said front frame;

said front frame having a seat-support member which extends primarily vertical at a rear portion of said front frame, and said rear frame having shock-support means with a forward portion lying beside said seat-support member of said front frame and with a forward end lying in front of said seat-support member, said forward end of said shock-support means connected to the rearward end of said shock absorber;

said shock absorber being preloaded, and said forward portions of said shock-support means being supported by said seat-support member against rearward movement under the force of said preloading when there is no rider on said seat.

4. A bicycle comprising:

front and rear wheels;

a front frame having a forward end and having a lower rearward portion located between the wheels, said lower rearward portion having a pedal bearing and a rear frame bearing;

a seat for holding a rider;

a pedal assembly rotatably mounted on the pedal bearing, for rotational driving by the rider;

chain means coupling the pedal assembly to the rear wheel;

a rear frame having a rearward portion rotatably connected to the rear wheel, a lower front portion pivotally mounted on the rear frame bearing, and an upper front portion; and a shock absorber having a rearward end connected to said upper front portion of said rear frame and a forward end connected to said front frame;

said front frame having a seat-support member which extends primarily vertical at a rear portion of said front frame and which supports said seat, and said rear frame having shock-support members with forward portions extending beside said seat-support member of said front frame and with forward ends lying in front of said seat-support member and connected to the rearward end of said shock absorber;

the front and rear ends of said shock absorber being pivotally connected respectively to said front frame and to said shock-support members of said rear frame, and said shock absorber being free of confinement by either of said frames between the pivotally connected ends of said shock absorber.

5. The bicycle described in claim 4 wherein:

said front frame including an upper elongated member extending substantially horizontally between said forward end of said front frame and an upper portion of said rear seat support-member thereof; and said forward and rearward ends of said shock absorber lies below said upper elongated member.

6. The bicycle described in claim 5 wherein:

said front frame includes a pair of bracing members lying below said upper member and extending on either side of said shock absorber and below the axis of said shock absorber.

7. The bicycle described in claim 4 wherein:

said front frame includes a primarily vertically extending tubular steering member for holding a handlebar shaft, and includes a diagonal elongated member extending downwardly and rearwardly from said tubular front member to said lower rearward portion of said front frame; and including a bracket attached to said diagonal member at a location immediately below said steering member, said bracket attached to the front end of said shock absorber.

* * * * *